US012688674B2

(12) United States Patent　　　　(10) Patent No.:　US 12,688,674 B2
Takahashi et al.　　　　　　　　　　(45) Date of Patent:　　Jul. 21, 2026

(54) DETECTION DEVICE, DETECTION METHOD, AND DETECTION PROGRAM

(71) Applicant: NTT, Inc., Tokyo (JP)

(72) Inventors: Tomokatsu Takahashi, Musashino (JP); Masanori Yamada, Musashino (JP); Tomohiro Nagai, Musashino (JP); Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 271 days.

(21) Appl. No.: 18/563,935

(22) PCT Filed: May 28, 2021

(86) PCT No.: PCT/JP2021/020487
§ 371 (c)(1),
(2) Date: Nov. 24, 2023

(87) PCT Pub. No.: WO2022/249472
PCT Pub. Date: Dec. 1, 2022

(65) Prior Publication Data
US 2024/0303966 A1　　Sep. 12, 2024

(51) Int. Cl.
*G06V 10/764*　　　(2022.01)
*G06V 10/74*　　　(2022.01)

(52) U.S. Cl.
CPC .......... *G06V 10/764* (2022.01); *G06V 10/761* (2022.01)

(58) Field of Classification Search
CPC .. G06V 10/764; G06V 10/761; G06V 20/582; G06F 18/24133; G06N 3/08
See application file for complete search history.

(56) References Cited

U.S. PATENT DOCUMENTS

| | | | |
|---|---|---|---|
| 2019/0238568 A1* | 8/2019 | Goswami | G06N 3/082 |
| 2020/0151505 A1* | 5/2020 | Saito | G06F 18/214 |
| 2021/0150357 A1* | 5/2021 | Karras | G06N 3/0475 |
| 2022/0174089 A1* | 6/2022 | Piegert | G06N 3/0464 |
| 2023/0022943 A1* | 1/2023 | Xiao | G06T 5/70 |
| 2024/0005209 A1* | 1/2024 | Schmidt | G06N 3/094 |

FOREIGN PATENT DOCUMENTS

| | | | | |
|---|---|---|---|---|
| EP | 3751453 A1 * | 12/2020 | | G06V 30/248 |

OTHER PUBLICATIONS

Cassidy Laidlaw et al., "Perceptual Adversarial Robustness: Defense Against Unseen Threat Models", Published as a conference paper at ICLR 2021, Jan. 25, 2021, 25 pages.
Richard Zhang et al., "The Unreasonable Effectiveness of Deep Features as a Perceptual Metric", 2018 IEEE/CVF Conference on Computer Vision and Pattern Recognition, 2018, 10 pages.
Goodfellow, et al., "Explaining and Harnessing Adversarial Examples", arXiv:1412.6572v3 [stat.ML], Mar. 20, 2015, pp. 1-11.
Lee et al., "A Simple Unified Framework for Detecting Out-of-Distribution Samples and Adversarial Attacks", arXiv:1807.03888v2 [stat.ML], Oct. 27, 2018, pp. 1-20.
Laidlaw et al., "Functional Adversarial Attacks", arXiv:1906.00001v2 [cs.LG], Oct. 29, 2019, pp. 1-16.

* cited by examiner

*Primary Examiner* — John B Strege
(74) *Attorney, Agent, or Firm* — XSENSUS LLP

(57)　　　　　ABSTRACT

A detection device includes processing circuitry configured to acquire data to be detected and normal reference data, calculate a Learned Perceptual Image Patch Similarity (LPIPS) distance between the acquired data and the reference data, and classify the acquired data into either a Clean Sample or an Adversarial Example by using the calculated LPIPS distance.

8 Claims, 7 Drawing Sheets

DETECTION DEVICE, DETECTION METHOD, AND DETECTION PROGRAM

CROSS-REFERENCE TO RELATED APPLICATION

The present application is based on PCT filing PCT/JP2021/020487, filed May 28, 2021, the entire contents of which are incorporated herein by reference.

TECHNICAL FIELD

The present invention relates to a detection device, a detection method, and a detection program.

BACKGROUND ART

There has been known an Adversarial Example which is an adverse sample created by artificially adding a minute noise to data, which is to be input to a deep learning model, so as to disturb an output (see NPL 1). For example, an Adversarial Example of an image has the problem of mis-classifying the output of deep learning without changing its appearance and without human recognition. For example, there is a threat that the type of a sign recognized by an automated vehicle is changed to another type. Accordingly, since the Adversarial Example poses a major threat for the safety of AI services, the creation of countermeasure techniques for it in deep learning is expected.

Measures against the Adversarial Example are classified into several groups according to its policy. For example, there are four typical policies as follows: (1) a robust deep learning model capable of normally classifying an Adversarial Example is learned; (2) an Adversarial Example is detected and removed before being input to the deep learning model; (3) delete perturbation added to the Adversarial Example, to restore the original data; (4) disturb the use of model information necessary for creating the Adversarial Example.

CITATION LIST

Non Patent Literature

[NPL 1] Ian J. Goodfellow et al., "EXPLAINING AND HARNESSING ADVERSARIAL EXAMPLES," [online], March 2015, [Searched on Apr. 26, 2021] Internet <URL: http://https://arxiv.org/abs/1412.6572>

SUMMARY OF INVENTION

Technical Problem

However, there is no conventional technology that can perfectly prevent the Adversarial Example. On the other hand, since the countermeasures can be taken without modifying the deep learning model, a technique for detecting and removing Adversarial Example before it is input to the deep learning model as described in (2) above has been attracting attention.

The present invention has been made in view of the above, and an object of the present invention is to detect and remove an Adversarial Example before inputting it into a deep learning model.

Solution to Problem

In order to solve the foregoing problems and achieve the object, a detection device includes: processing circuitry configured to: acquire data to be detected and normal reference data; calculate a Learned Perceptual Image Patch Similarity (LPIPS) distance between the acquired data and the reference data; and classify the acquired data into either a Clean Sample or an Adversarial Example by using the calculated LPIPS distance.

Advantageous Effects of Invention

According to the present invention, it is possible to detect and remove an Adversarial Example before inputting it into a deep learning model.

DESCRIPTION OF EMBODIMENTS

Figure 1:
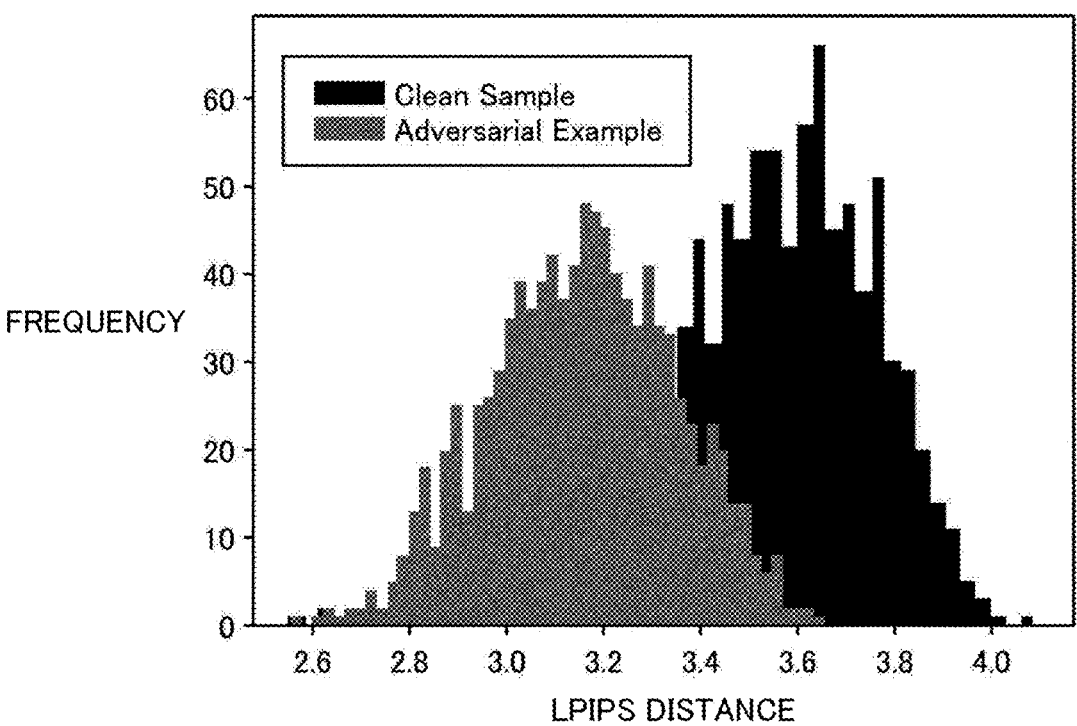
FIG. 1 is a diagram for describing an outline of a detection device according to the present embodiment.

An embodiment of the present invention will be described hereinafter in detail with reference to the drawings. Note that the present invention is not limited to the embodiment.

Furthermore, the same constituent elements are denoted by the same reference numerals in the descriptions of the drawings.

Figure 2:
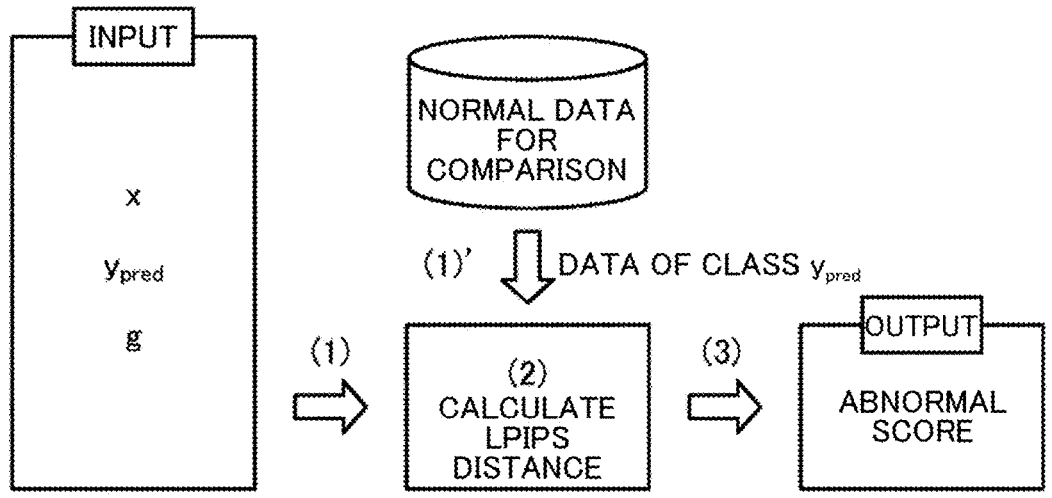
FIG. 2 is a diagram for describing an outline of a detection device according to the present embodiment.

[Overview of Detection Device] FIGS. 1 and 2 are diagrams for explaining an outline of a detection device according to the present embodiment. The detection device of the present embodiment detects an Adversarial Example by using an LPIPS (Learned Perceptual Image Patch Similarity) distance which is the latest index for measuring the distance between images.

Here, the LPIPS distance is an index for measuring the distance between images by normalizing an intermediate output of a deep learning model for each channel and obtaining a difference, the index being a value calculated as shown by the following equation (1).

[Math. 1]

$$LPIPS(x_1, x_2) = \|\phi(x_1) - \phi(x_2)\|_2 \tag{1}$$
$$\phi(x) = \left( \frac{\hat{g}_1(x)}{\sqrt{W_1 H_1}}, \ldots, \frac{\hat{g}_L(x)}{\sqrt{W_L H_L}} \right)$$
$$\hat{g}_l(x) = (\hat{g}_{l1}(x), \ldots, \hat{g}_{lC}(x))$$
$$\hat{g}_{lc}(x) = \frac{g_{lc}(x)}{\sum_{w}^{W} \sum_{h}^{H} g_{lcwh}(x)}$$

Where $g_l(x)$ Output of 1 layer $g_{lc}(x)$: Output of channel c of 1 layer $W_l$: Vertical size of output of 1 layer $H_l$: Horizontal size of output of 1 layer Further, as shown in FIG. 1, it is found that the LPIPS distance with the reference data, which is normal data for comparison with an Adversarial Example and a Clean Sample, is different between the Adversarial Example and the Clean Sample which is normal data.

Therefore, the detection device classifies the Adversarial Example and the Clean Sample according to the difference in LPIPS distance, thereby detecting the Adversarial Example.

Specifically, as shown in FIG. 2, the detection device accepts inputs of data x to be detected, its prediction class y_pred, a deep learning model g, and data belonging to class y_pred out of the reference data which is normal data for comparison (shown in (1), (1)' in FIG. 2). The detection device also calculates the LPIPS distance between the data x and the reference data belonging to class y_pred ((2) shown in FIG. 2), and outputs the minimum value out of these values as an abnormality score ((3) shown in FIG. 2). Then, the detection device classifies the data x into normal/abnormal states, that is, into Clean Sample/Adversarial Example, by using the abnormality score.

Thus, the detection device detects and removes the Adversarial Example before inputting it to the deep learning model g, allowing for countermeasures against the Adversarial Example without modifying the deep learning model g.

[Configuration of Detection Device]

Figure 3:
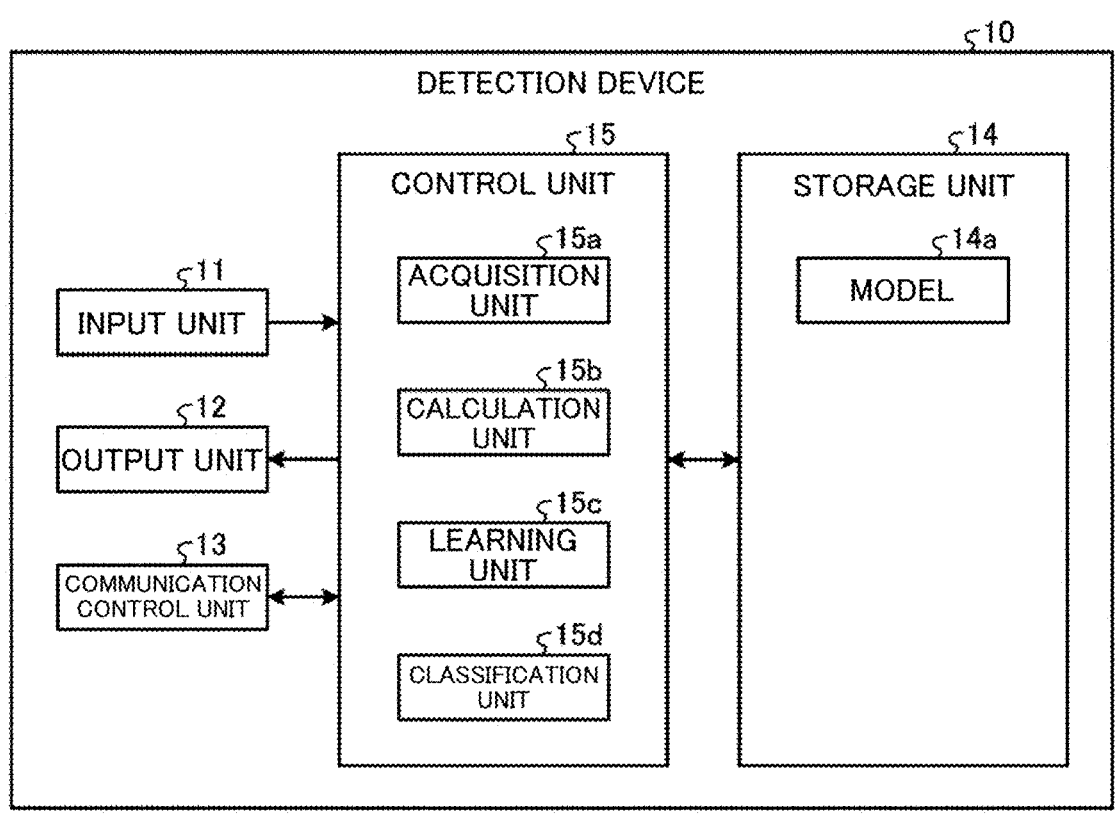
FIG. 3 is a schematic diagram illustrating a schematic configuration of the detection device according to the present embodiment.

FIG. 3 is a schematic diagram illustrating a schematic configuration of the detection device according to the present embodiment. As exemplified in FIG. 3, a detection device 10 according to the present embodiment is implemented by a general computer such as a personal computer, and includes an input unit 11, an output unit 12, a communication control unit 13, a storage unit 14, and a control unit 15.

The input unit 11 is realized by using an input device such as a keyboard or a mouse, and inputs various pieces of instruction information, such as start of processing, to the control unit 15 in response to an input operation from an operator. The output unit 12 is realized by a display device such as a liquid crystal display, a printing device such as a printer, or the like. For example, a result of detection processing to be described below is displayed on the output unit 12.

The communication control unit 13 is implemented by, for example, a Network Interface Card (NIC), and controls electric communication between the control unit 15 and an external device via a telecommunication line such as a Local Area Network (LAN) or the Internet. For example, the communication control unit 13 controls communication between the control unit 15 and a management device or the like that manages data to be subjected to detection processing.

The storage unit 14 is realized by a semiconductor memory element such as a RAM (Random Access Memory) or a flash memory, or a storage device such as a hard disk or an optical disc. The storage unit 14 stores in advance, for example, a processing program that operates the detection device 10 and data to be used during execution of the processing program, or the storage unit 14 stores the processing program and the data temporarily every time the processing is executed. In the present embodiment, the storage unit 14 stores a model 14a used for detection processing to be described below. Note that the storage unit 14 may also be configured to communicate with the control unit 15 via the communication control unit 13.

the control unit 15 is implemented by using a CPU (Central Processing Unit) or the like, and executes a processing program stored in a memory. Thus, the control unit 15 functions as an acquisition unit 15a, a calculation unit

15b, a learning unit 15c, and a classification unit 15d, as illustrated in FIG. 2. Note that each or some of these functional units may be mounted on a different piece of hardware. For example, the learning unit 15c may be mounted on hardware different from other functional units. Also, the control unit 15 may include another functional unit.

The acquisition unit 15a acquires data to be detected and normal reference data. For example, the acquisition unit 15a acquires data to be subjected to detection processing described later and the reference data which is the normal data for comparison, from the management device or the like via the input unit 11 or the communication control unit 13.

The acquisition unit 15a may store the acquired data and the reference data into the storage unit 14. In this case, the calculation unit 15b described later acquires the data and the reference data from the storage unit 14 and executes processing.

The calculation unit 15b calculates an LPIPS distance between the acquired data and the reference data. Specifically, the calculation unit 15b calculates the LPIPS distance between the data x to be detected and the reference data which is the normal data for comparison, according to the equation (1), as described above. The calculation unit 15b delivers the minimum value among LPIPS distances calculated between each pieces of data and a plurality of pieces of reference data, as an abnormality score of the data, to the learning unit 15c and the classification unit 15d described later.

The learning unit 15c learns the model 14a for classifying data into normal or abnormal by using the calculated LPIPS distance as an abnormality score. Specifically, the learning unit 15c generates the model 14a for classifying each piece of data by learning, so that the abnormality score of each piece of data calculated by the calculation unit 15b, that is, the LPIPS distance, follows the distribution illustrated in FIG. 1. The generated model 14a outputs whether the input data are normal data, that is, Clean Sample, or abnormal data, that is, Adversarial Example.

The classification unit 15d classifies the acquired data into either a Clean Sample or an Adversarial Example by using the calculated LPIPS distance. Specifically, the classification unit 15d classifies the acquired data into either normal Clean Sample or abnormal Adversarial Example by using the model 14a for classifying the data into either normal or abnormal, with the calculated LPIPS distance as an abnormality score. That is, the classification unit 15d classifies the acquired data to be detected, into either normal data, that is, Clean Sample, or abnormal data, that is, Adversarial Example, by using the learned model 14a.

Also, when an Adversarial Example is detected, the classification unit 15d outputs the Adversarial Example to the output unit 12.

Therefore, the detection device 10 can detect an Adversarial Example accurately. Therefore, the Adversarial Example is removed before being input to the deep learning model g, and countermeasures against the Adversarial Example can be taken without modifying the deep learning model g.

Figure 4:
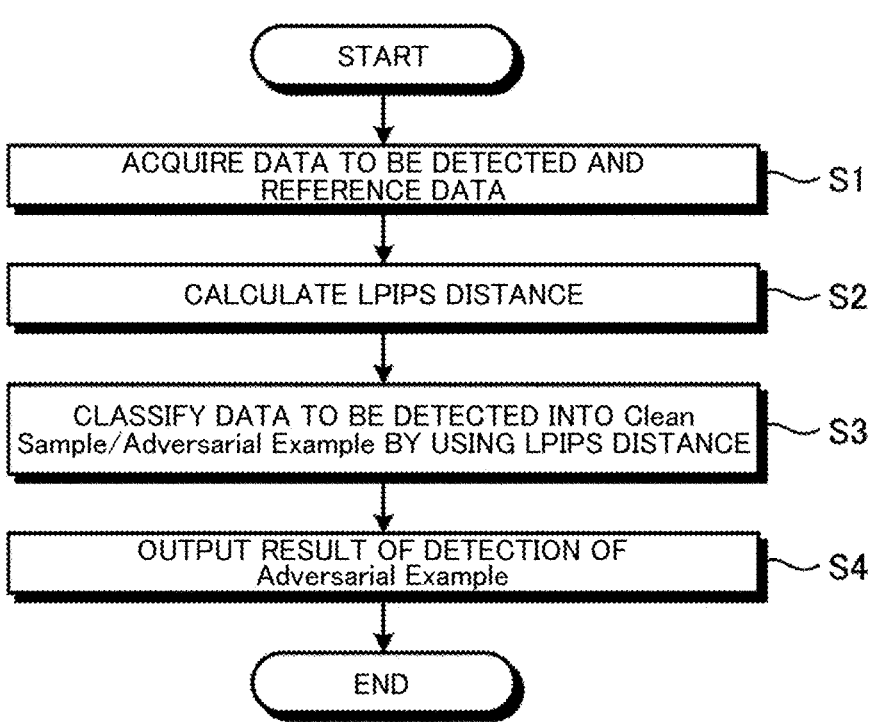
FIG. 4 is a flow chart showing a detection processing procedure.

[Detection Processing] Next, the detection processing by the detection device 10 according to the present embodiment is described with reference to FIG. 4. FIG. 4 is a flow chart illustrating a detection processing procedure. The flow chart shown in FIG. 4 starts at the timing when the user makes an operation input indicating the start.

First, the acquisition unit 15a acquires data to be detected and reference data (step S1). For example, the acquisition unit 15a acquires data to be subjected to the detection processing and reference data which is the normal data for comparison, via the input unit 11 or the communication control unit 13.

Next, the calculation unit 15b calculates an LPIPS distance between the acquired data to be detected and the reference data (step S2). The calculation unit 15b delivers the minimum value out of the LPIPS distances calculated between each piece of data and a plurality of pieces of reference data, to the classification unit 15d, as an abnormality score of the data.

The calculation unit 15b may deliver the calculated abnormality score to the learning unit 15c. In this case, the learning unit 15c learns the model 14a for classifying the data into normal or abnormal, and stores the generated model 14a in the storage unit 14.

Then, the classification unit 15d classifies the acquired data into either a Clean Sample or an Adversarial Example by using the calculated LPIPS distance (step S3). Specifically, the classification unit 15d classifies the acquired data to be detected, into either normal data, that is, Clean Sample, or abnormal data, that is, Adversarial Example, by using the learned model 14a.

Also, when an Adversarial Example is detected, the classification unit 15d outputs the Adversarial Example to another device or the like as a detection result via the output unit 12 and the communication control unit 13 (step S4). In this manner, a series of detection processing are finished.

[Effects] As described above, in the detection device 10 of the present embodiment, the acquisition unit 15a acquires the data to be detected and the normal reference data. The calculation unit 15b calculates an LPIPS distance between the acquired data and the reference data. The classification unit 15d also classifies the acquired data into either a Clean Sample or an Adversarial Example by using the calculated LPIPS distance.

Specifically, the classification unit 15d classifies the acquired data into either a normal Clean Sample or an abnormal Adversarial Example by using the model 14a for classifying the data into either normal or abnormal, with the calculated LPIPS distance as an abnormality score.

Therefore, the detection device 10 can detect an Adversarial Example accurately. Therefore, the Adversarial Example is removed before being input to the deep learning model, and countermeasures against the Adversarial Example, which is a major threat to the safety of AI services, can be taken without modifying the deep learning model. Thus, the detection device 10 can secure the safety of AI services.

The learning unit 15c learns the model 14a for classifying the data into normal or abnormal by using the calculated LPIPS distance as an abnormality score. Therefore, the detection device 10 can accurately detect an Adversarial Example that continues to change day by day.

Figure 5:
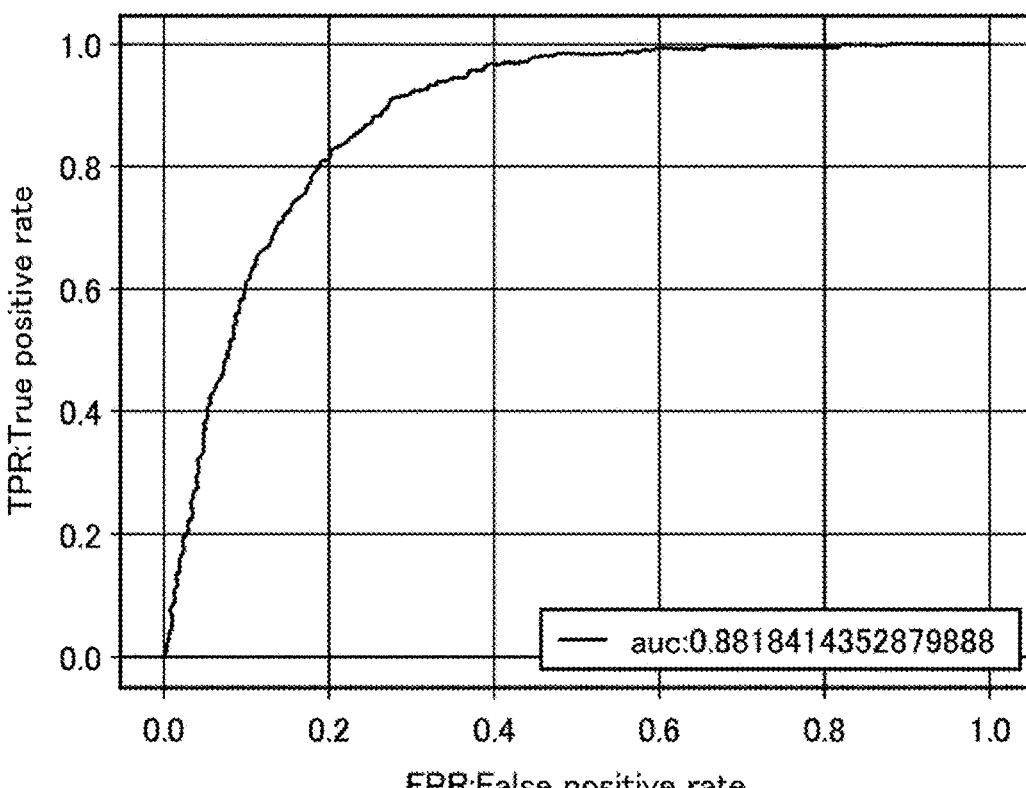
FIG. 5 is a diagram for describing an example.
Figure 6:
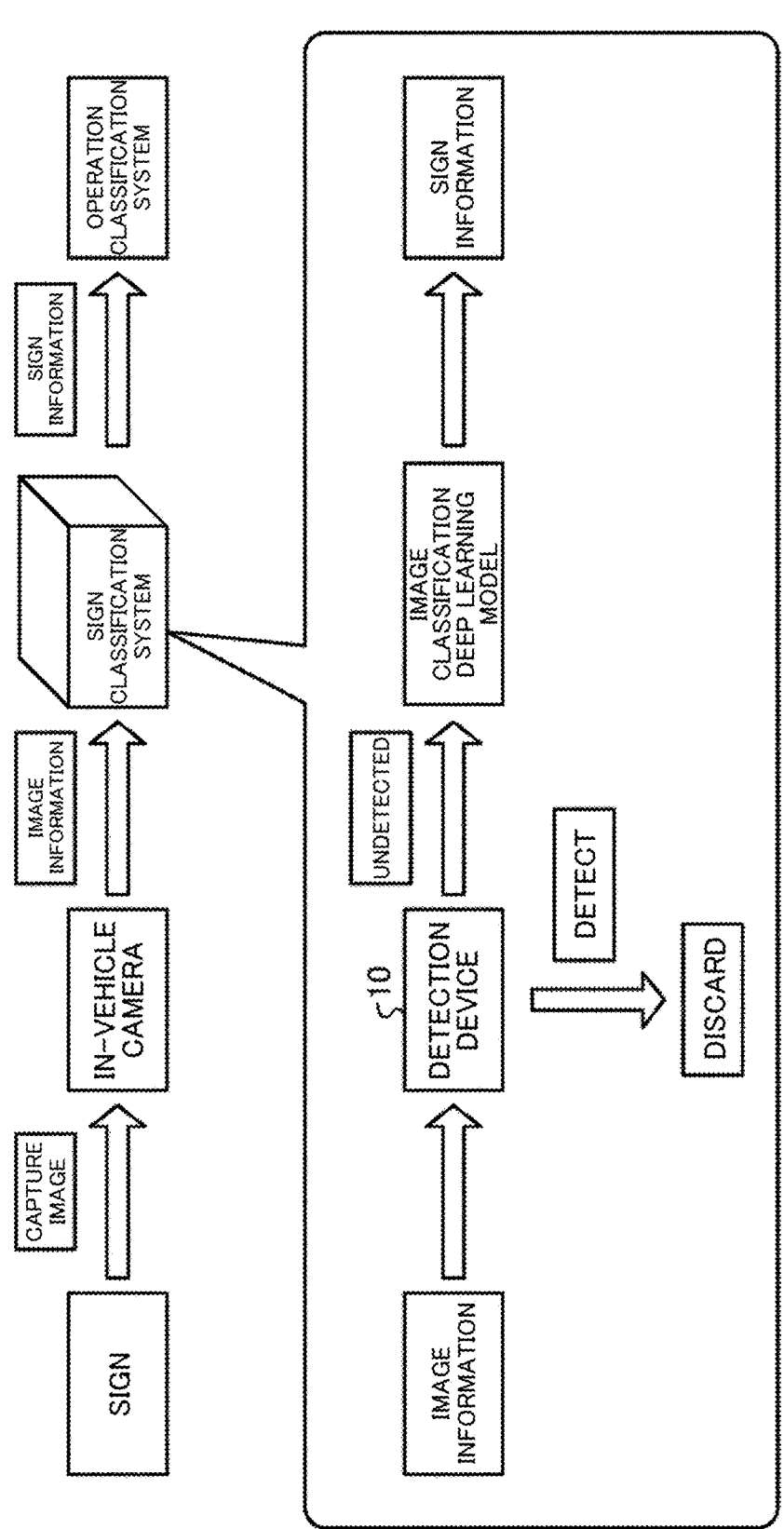
FIG. 6 is a diagram for describing an example.

FIGS. 5 and 6 are diagrams for explaining an example. FIG. 5 is a ROC (Receiver Operating Characteristic Curve) curve showing the result of the detection process of the above-described embodiment with respect to the Adversarial Example and Clean Sample shown in the histogram of FIG. 1. In the present example, ResNet 18 is applied for the deep learning model, cifar 10 is applied for the data set, and PGD (see "arxiv.org/abs/1706.06083") is applied for the Adversarial Example.

As a result, in the example shown in FIG. 5, an AUC (Area Under Curve) value of the ROC curve, which indicates that the closer to 1 the model is, the higher the performance, is 0.88, confirming that Adversarial Example can be detected with high accuracy.

FIG. 6 illustrates an example of applying the detection device 10 according to the foregoing embodiment to a sign classification system. In the sign classification system shown in FIG. 6, in the detection device 10, the acquisition unit 15a acquires a sign photographed by a camera as data to be detected, and the classification unit 15d detects an Adversarial Example. Then, the detection device 10 discards an Adversarial Example when the Adversarial Example is detected, and inputs the Adversarial Example to the deep learning model when the Adversarial Example is not detected. Thus, for example, erroneous recognition of a sign by an automated vehicle is prevented, and safety of vehicle body control can be secured.

[Program] It is also possible to create a program in which the processing executed by the detection device 10 according to the foregoing embodiment is described in a language executable by a computer. As one embodiment, the detection device 10 can be implemented by installing a detection program for executing the detection processing as package software or online software in a desired computer. For example, by causing an information processing device to execute the detection program, the information processing device can be caused to function as the detection device 10. The information processing device described herein can be a desktop type or laptop type personal computer. In addition, the information processing device can be a mobile communication terminal such as a smartphone, a mobile phone, and a PHS (Personal Handyphone System), and a slate terminal such as a PDA (Personal Digital Assistant). The function of the detection device 10 may be implemented by a cloud server.

Figure 7:
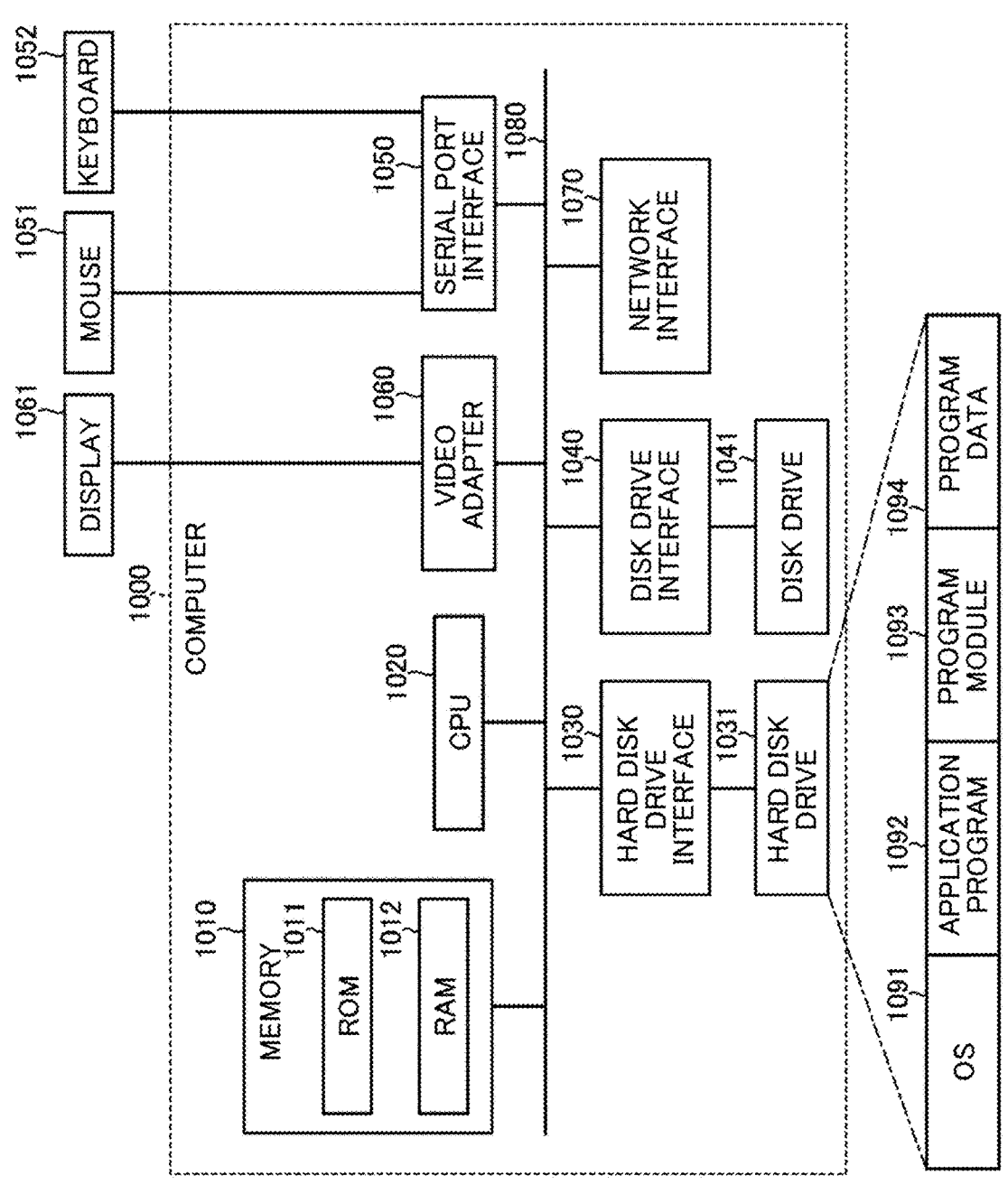
FIG. 7 is a diagram showing an example of a computer that executes a detection program.

FIG. 7 is a diagram illustrating an example of a computer that executes the detection program. A computer 1000 has a memory 1010, a CPU 1020, a hard disk drive interface 1030, a disk drive interface 1040, a serial port interface 1050, a video adapter 1060, and a network interface 1070, for example. These units are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to a hard disk drive 1031. The disk drive interface 1040 is connected to a disk drive 1041. A removable storage medium such as a magnetic disk or an optical disk is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each of the pieces of information described in the above embodiment is stored in, for example, the hard disk drive 1031 or the memory 1010.

The detection program is stored in the hard disk drive 1031 as the program module 1093 in which commands executed by the computer 1000 are described, for example. Specifically, the program module 1093 describing each processing to be executed by the detection device 10 described in the foregoing embodiment is stored in the hard disk drive 1031.

The data used for information processing by the detection program is stored in the hard disk drive 1031, for example, as the program data 1094. Thereafter, the CPU 1020 reads out the program module 1093 and the program data 1094 stored in the hard disk drive 1031 to the RAM 1012 when necessary, and executes each of the above-described procedures.

Note that the program module 1093 and program data 1094 related to the detection program are not limited to being stored in the hard disk drive 1031, and may also be stored in, for example, a removable storage medium and read out by the CPU 1020 via the disk drive 1041, or the like. Alternatively, the program module 1093 and the program data 1094 related to the detection program may be stored in another computer connected via a network such as a LAN or WAN (Wide Area Network), and may be read by the CPU 1020 via the network interface 1070.

Although the embodiments to which the invention made by the inventor thereof is applied have been described above, the present invention is not limited by the descriptions and drawings forming a part of the disclosure of the present invention according to the embodiments. That is to say, other embodiments, examples, operation techniques, and the like made by those skilled in the art on the basis of the embodiments are all included in the scope of the present invention.

REFERENCE SIGNS LIST

10 Detection device
11 Input unit
12 Output unit
13 Communication control unit
14 Storage unit
14*a* Model
15 Control unit
15*a* Acquisition unit
15*b* Calculation unit
15*c* Learning unit
15*d* Classification unit

The invention claimed is:

1. A detection device comprising:
processing circuitry configured to:
    acquire data to be detected;
    acquire normal reference data separately from the data to be detected;
    calculate a Learned Perceptual Image Patch Similarity (LPIPS) distance between the acquired data and the reference data; and
    classify the acquired data into either a Clean Sample or an Adversarial Example by using the calculated LPIPS distance,
    wherein the processing circuitry is further configured to determine a minimum value among a plurality of calculated LPIPS distances and to classify the acquired data using the determined minimum value.

2. The detection device according to claim 1, wherein the processing circuitry is further configured to classify the acquired data into either a normal Clean Sample or an abnormal Adversarial Example by using a model for classifying the data into normal or abnormal, using the calculated LPIPS distance as an abnormality score.

3. The detection device according to claim 2, wherein the processing circuitry is further configured to learn the model for classifying data into normal or abnormal, using the calculated LPIPS distance as an abnormality score.

4. The detection device according to claim 1, wherein the processing circuitry is further configured to acquire a sign photographed by a camera, as the data to be detected, and detect an Adversarial Example.

5. A detection method to be executed by a detection device, the detection method comprising:
    acquiring data to be detected;
    acquiring normal reference data separately from the data to be detected;
    calculating a Learned Perceptual Image Patch Similarity (LPIPS) distance between the acquired data and the reference data; and
    classifying the acquired data into either a Clean Sample or an Adversarial Example by using the calculated LPIPS distance,
    wherein a minimum value among a plurality of calculated LPIPS distances is determined and the acquired data is classified using the determined minimum value.

6. A non-transitory computer-readable recording medium storing therein a detection program that causes a computer to execute a process comprising:
    acquiring data to be detected;
    acquiring normal reference data separately from the data to be detected;
    calculating a Learned Perceptual Image Patch Similarity (LPIPS) distance between the acquired data and the reference data; and
    classifying the acquired data into either a Clean Sample or an Adversarial Example by using the calculated LPIPS distance,
    wherein a minimum value among a plurality of calculated LPIPS distances is determined and the acquired data is classified using the determined minimum value.

7. The detection device according to claim 1, wherein the processing circuitry is further configured to acquire a prediction class of the data to be detected.

8. The detection device according to claim 1, wherein the detection device is incorporated into an autonomous vehicle.

* * * * *